(12) United States Patent
Franosch et al.

(10) Patent No.: US 9,378,517 B2
(45) Date of Patent: Jun. 28, 2016

(54) METHODS AND SYSTEMS FOR PROVIDING POTENTIAL SEARCH QUERIES THAT MAY BE TARGETED BY ONE OR MORE KEYWORDS

(71) Applicant: Google Inc., Mountain View, CA (US)

(72) Inventors: Jan-Moritz Peter Franosch, Zürich (CH); Wojciech Skut, Zürich (CH); Bianca Madalina Milatinovici, Zürich (CH); Lars Kåre Engebretsen, Zürich (CH); Julia Maria Lennerz, Zürich (CH); Nadine Sandra Gerspacher, Zürich (CH); Elias Lieberich, Zürich (CH); Ritter Ádám, Zürich (CH)

(73) Assignee: Google Inc., Mountain View, CA (US)

( * ) Notice: Subject to any disclaimer, the term of this patent is extended or adjusted under 35 U.S.C. 154(b) by 420 days.

(21) Appl. No.: 13/934,805

(22) Filed: Jul. 3, 2013

(65) Prior Publication Data
US 2015/0012560 A1 Jan. 8, 2015

(51) Int. Cl.
*G06F 7/00* (2006.01)
*G06F 17/30* (2006.01)
*G06Q 30/02* (2012.01)

(52) U.S. Cl.
CPC ........ *G06Q 30/0275* (2013.01); *G06F 17/3064* (2013.01)

(58) Field of Classification Search
CPC ................ G06Q 30/0275; G06F 17/30; G06F 17/30477; G06F 17/3064
See application file for complete search history.

(56) References Cited

U.S. PATENT DOCUMENTS

| | | | |
|---|---|---|---|
| 8,099,412 B2 | 1/2012 | Yan et al. | |
| 8,229,925 B2 | 7/2012 | Haugen et al. | |
| 2005/0276399 A1* | 12/2005 | Thompson | H04L 12/66 379/93.12 |
| 2009/0063462 A1* | 3/2009 | Alfonseca | G06F 17/30672 |
| 2009/0192983 A1 | 7/2009 | Elango | |
| 2009/0271228 A1* | 10/2009 | Bilenko | G06Q 30/02 705/7.29 |
| 2010/0198857 A1* | 8/2010 | Metzler | G06Q 30/0256 707/768 |
| 2010/0257171 A1 | 10/2010 | Shekhawat | |
| 2012/0047025 A1* | 2/2012 | Strohman | G06F 17/3064 705/14.71 |

* cited by examiner

*Primary Examiner* — Azam Cheema
(74) *Attorney, Agent, or Firm* — Foley & Lardner LLP; John D. Lanza

(57) ABSTRACT

Systems and methods for providing potential search queries that may be targeted by a given keyword. The method includes receiving, from a third-party content provider, a request to identify one or more search queries that match a given keyword. A table corresponding to the given keyword is identified. The table includes one or more search queries with which at least one third-party content item was selected for display. The selected third-party content item was selected responsive to a bid for the given keyword. The method determines from the identified table, one or more search queries that correspond to the given keyword. The determined search queries that correspond to the given keyword are those search queries that can be targeted by the given keyword. The method provides for display, the determined search queries that correspond to given keyword.

13 Claims, 6 Drawing Sheets

Advertising Auction Log 200

| Auction ID 202 | Search Query 204 | Spell Corrected Search Query 206 | Winning Advertisement 208a-n | Keyword 210a-n | Country 212 | Language 214 |
|---|---|---|---|---|---|---|
| | | | | | | |
| | | | | | | |

FIG. 2A

Keyword Table 250

| Actual Keyword 252 | Search Query 254 | Spell Corrected Search Query 256 | Country 258 | Language 260 | Query Frequency 262 |
|---|---|---|---|---|---|
| | | | | | |
| | | | | | |

FIG. 2B

METHODS AND SYSTEMS FOR PROVIDING POTENTIAL SEARCH QUERIES THAT MAY BE TARGETED BY ONE OR MORE KEYWORDS

BACKGROUND

Pay-per-click (PPC) products are auction-based systems in which third-party content providers place bids on keywords to serve third-party content items for display alongside primary content provided by a first-party content provider. Oftentimes, a third-party content provider may place inappropriate bids that are either too high or too low due to the third-party content provider's inability to analyze data. These bids are often based on guesswork. Further, the third-party content provider guesses on the actual user queries with which the third-party content items corresponding to the bids is shown. By placing inappropriate bids, especially on inappropriate user queries, the third-party content provider tends to pay more for third-party content items, thereby increasing costs and reducing profits for the third-party content provider. At present, some third-party content providers manually analyze reports that include third-party content performance data to determine appropriate bid values but the analysis is time consuming and often done too late to be useful if at all, resulting in efficiency loss and thus lower profit.

SUMMARY

At least one aspect is directed to a computer implemented method for providing a third-party content provider a plurality of potential search queries that may be targeted by a given keyword. The method includes receiving, from a third-party content provider, a request to identify one or more search queries that match a given keyword. A table corresponding to the given keyword is identified. The table includes one or more search queries with which at least one third-party content item was selected for display. The selected third-party content item was selected responsive to a bid for the given keyword. The method further determines from the identified table, one or more search queries that correspond to the given keyword. The determined search queries that correspond to the given keyword are those search queries that can be targeted by the given keyword. The method then provides for display, the determined search queries that correspond to one or several given keywords.

In some implementations, identifying a table corresponding to the given keyword includes determining a raw form of the given keyword and identifying a table corresponding to the raw form of the given keyword. The table includes one or more search queries with which at least one third-party content item was selected for display. The selected third-party content item was selected responsive to a bid for a keyword that corresponds to the raw form of the given keyword.

In some implementations, determining a raw form of the given keyword includes performing one or more of correcting misspelt words, replacing plural words with singular words and replacing uppercase letters with lowercase letters. In some implementations, determining a raw form of the given keyword includes arranging tokens corresponding to the given keyword in alphabetical order.

In some implementations, the table includes one or more of targeting information, a query frequency, a keyword frequency with which a particular keyword was used to select a third-party content item showed and a spell-corrected query.

In some implementations, the method includes identifying, from a log of historical auction data, a plurality of keywords associated with third-party content items selected for display responsive to receiving a search query. The method then determines a raw form of each of the identified keywords and generates a table for each of the determined raw forms. The table includes one or more search queries, a frequency of the search queries, a permutation code indicating an order of tokens that comprise the raw forms and one or more bit mask modifiers indicating possible match types for the tokens. In some implementations, the method includes determining if the number of search queries corresponding to a raw form of each of the identified keywords exceeds a predetermined threshold. The method in response to the determination, generates a table for the identified keywords that correspond to a number of search queries that exceeds the predetermined threshold.

In some implementations, the method includes identifying, from a log of historical auction data, a plurality of keywords associated with third-party content items selected for display responsive to receiving a search query. The keywords are identified from auctions that occurred within a predetermined time range. In some implementations, the determined search queries that correspond to the given keyword can be targeted by the given keyword based on a match type associated with the given keyword.

At least one aspect is directed to a computer-readable storage medium for providing a third-party content provider a plurality of potential search queries that may be targeted by a given keyword. The computer-readable storage medium includes computer-executable instructions, which when executed by a computer, cause the computer to receive, from a third-party content provider, a request to identify one or more search queries that match a given keyword. A table corresponding to the given keyword is identified. The table includes one or more search queries with which at least one third-party content item was selected for display. The selected third-party content item was selected responsive to a bid for the given keyword. The computer then determines from the identified table, one or more search queries that correspond to the given keyword. The determined search queries that correspond to the given keyword are those search queries that can be targeted by the given keyword. The computer provides for display, the determined search queries that correspond to given keyword.

In some implementations, identifying a table corresponding to the given keyword includes determining a raw form of the given keyword and identifying a table corresponding to the raw form of the given keyword. The table includes one or more search queries with which at least one third-party content item was selected for display. The selected third-party content item was selected responsive to a bid for a keyword that corresponds to the raw form of the given keyword.

In some implementations, determining a raw form of the given keyword includes performing one or more of correcting misspelt words, replacing plural words with singular words and replacing uppercase letters with lowercase letters. In some implementations, determining a raw form of the given keyword includes arranging tokens corresponding to the given keyword in alphabetical order.

In some implementations, the table includes one or more of targeting information, a query frequency, a keyword frequency with which a particular keyword was used to select a third-party content item showed and a spell-corrected query.

In some implementations, the computer identifies, from a log of historical auction data, a plurality of keywords associated with third-party content items selected for display responsive to receiving a search query. The computer then determines a raw form of each of the identified keywords and generates a table for each of the determined raw forms. The table includes one or more search queries, a frequency of the search queries, a permutation code indicating an order of tokens that comprise the raw forms and one or more bit mask modifiers indicating possible match types for the tokens.

In some implementations, the computer includes identifying, from a log of historical auction data, a plurality of keywords associated with third-party content items selected for display responsive to receiving a search query. The keywords are identified from auctions that occurred within a predetermined time range.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2A is a diagram depicting one implementation of an advertising auction log;

FIG. 2B is a diagram depicting one implementation of a table including entries corresponding to a raw form of a keyword;

DETAILED DESCRIPTION

Figure 1:
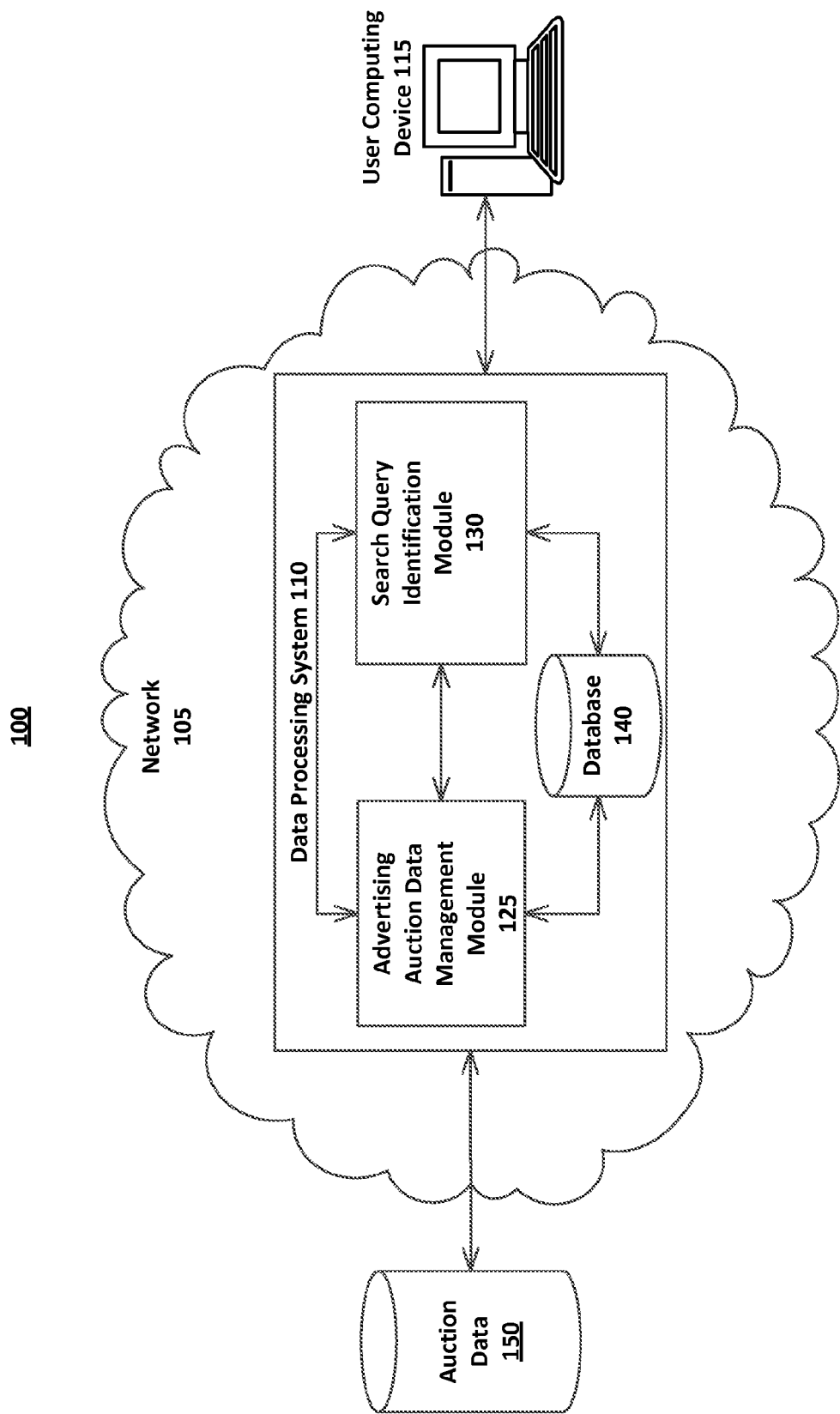
FIG. 1 is a block diagram depicting one implementation of an environment for providing a third-party content provider a plurality of potential search queries that may be targeted by a given keyword.

Following below are more detailed descriptions of various concepts related to, and implementations of, methods, apparatuses, and systems for providing one or more potential search queries that may be targeted by a given keyword. In some implementations, a third-party content provider may request to receive a plurality of potential search queries that may be targeted by a given keyword on which the third-party content provider can place bids. The plurality of potential search queries are selected from a log of auction data. The selection process is a two step process. First, based on the given keyword, the system can identify, from the log of auction data, one or more third-party content items that were selected for display in response to third-party content providers placing bids on the given keyword. Then, upon identifying the selected third-party content items, the system identifies, from the log of auction data, one or more search queries that triggered the selection of the selected third-party content items. The identified search queries are then provided for display as the one or more potential search queries that may be targeted by the given keyword. The various concepts introduced above and discussed in greater detail below may be implemented in any of numerous ways, as the described concepts are not limited to any particular manner of implementation. Examples of specific implementations and applications are provided primarily for illustrative purposes.

In online search advertising, third-party content items from one or more third-party content providers are selected for display along with search results that are generated responsive to search queries submitted by users. Third-party content items that are selected are typically closely related to the search queries as the third-party content items are selected based in part on the item's relevance to the search query. For a third-party content item to be considered for selection, a third-party content provider associated with the third-party content item can place bids on one or more keywords. The algorithmic processes selects third-party content items based on the value of the bid placed by the third-party content provider as well as the degree of relevance of the keyword on which the third-party content provider placed a bid to the search query provided by the user. In some implementations, the algorithmic processes determine the relevance of the third-party content item in part by determining the relevance of the keyword on which the third-party content provider bids to the search query for which the third-party content provider items are being selected.

Although third-party content providers aim to target specific search queries by bidding on keywords that closely match search queries, most search queries cannot be targeted by specifying the exact query as a keyword because a lot of search queries are unique due to, for example, typographical errors and word choices, thereby making it impractical to target every possible search query submitted by users.

As such, third-party content providers typically employ some sort of "broad match" targeting in which search queries are matched to keywords with the help of spell-correction, synonyms, close variants and alike. However, "broad match" targeting raises problems of its own. One problem is that third-party content providers can not tell ahead of time which user queries are or might be targeted by a "broad" keyword. Thus third-party content providers may unintentionally target search queries that the system determines as being related to the "broad match" query even though the search queries are unrelated to a third-party content provider's products or services and thus typically do not lead to conversions. For example, a third-party content provider may submit the keyword "pool" to the system in order to target "pool billiards" related queries. However, most queries that end up being targeted are related to the keyword "swimming pool." As a result, the third-party content provider may get clicks from users who search search queries related to the keyword "swimming pool." Such clicks do not convert, thereby increasing the third-party content provider's costs for displaying third-party content items related to pool billiards.

Even if the unrelated queries do not get any clicks, the third-party content provider's click through rate is negatively affected. A high click through rate is important because it influences the "quality score", which is a cost factor in second-price auctions. Thus, a lower click-through rate leads to a higher cost per click.

In some pay per click systems, third-party content providers can be informed of the queries on which the third-party content provider's third-party content items are clicked. In addition, third-party content providers can also be informed of the queries on which the third-party content provider's third-party content items were shown. In this way, the third-party content provider can, by monitoring the list of queries on which the third-party content items are shown, identify the types of search queries that are profitable and can modify their keyword inventory to target such search queries. For example, a third-party content provider bidding on the word "pool" but focused on "swimming pools" can filter out queries that relate to "billiard pool" by adding "billiard" as a negative limitation. However, this requires the third-party content provider to spend copious amounts of time monitoring list of queries and modifying their keyword inventory. Even though the third-party content provider can adjust its keyword inventory, the third-party content provider will still have to pay for unwanted impressions as the adjustments are made after the unwanted impressions are served.

As described above, the present disclosure relates to methods and systems for providing, for display to a third-party content provider, one or more potential search queries the third-party content provider may target with its keyword inventory identified based on historical search queries. In some implementations, search queries can be provided for display together with statistics like number of queries, number of clicks and average cost, potentially separated by language, country or other criteria. In this way, the third-party content provider can adjust one or more keywords on which the third-party content provider bids by adding keywords (e.g. if the frequency of queries targeted is too low to be useful), deleting keywords (if a keyword mostly targets irrelevant queries), making keywords more specific by adding tokens or modifiers that influence the "broadness" of a match (if a keyword targets some irrelevant queries), adding negatives (if a set of irrelevant queries contains the same token) or using any other method to change the set of targeted queries that the underlying system allows. The third-party content provider can also use the queries shown to get ideas for new keywords and add these keywords derived from the queries to the content provider's keyword inventory.

The methods and systems described herein can be configured to retrieve potentially matching queries responsive to receiving a request identifying one or more keywords. The retrieved matching queries can be displayed along with statistics of these queries. Statistics like query numbers, clicks and average cost per click can be either gathered from logs or joined in from existing databases. Identifying queries that have been previously searched and their statistics can allow a third-party content provider to adjust the keywords to improve performance, thereby benefiting the third-party content provider by improving the third-party content provider's quality score, while improving the content selection program by serving better quality third-party content items.

According to aspects of the present disclosure, systems and methods for providing a third-party content provider a plurality of potential search queries that may be targeted by a given keyword are provided. A data processing system receives a request to identify one or more search queries that can be targeted by a given keyword. The keyword can include one or more tokens and may be configured with one or more match type modifiers.

In some implementations, the data processing system identifies a keyword-specific table corresponding to the given keyword. In some implementations, the keyword-specific table corresponds to a raw form of the given keyword. In some implementations, a raw form of the given keyword can be determined by performing one or more of correcting misspelt words, replacing plural words with singular words and replacing uppercase letters with lowercase letters. In some implementations, determining a raw form of the given keyword includes arranging the tokens in alphabetical order. The data processing system can then identify a table that corresponds to the raw form of the given keyword. The table includes historical third-party content auction data related to keywords that are associated with the raw form. As described above, search results are provided for display along with selected third-party content items in response to receiving a search query. The third-party content items selected for display along with the search results are selected based on a third-party content provider placing a bid on a particular keyword. The table includes one or more keywords on which third-party content providers placed bids that are associated with the raw form. In addition, the table includes one or more search queries for which the selected third-party content items were displayed. In some implementations, the table can also include spell corrected versions of search queries, the number of times a query has been searched, amongst others.

The data processing system can identify a subset of search queries that can be targeted by the given keyword from the identified table. As the table includes search queries that correspond to the raw form of the given keyword, only a subset of the search queries may actually correspond to the given keyword. In some implementations in which the tables correspond to raw forms of the given keywords, the data processing system can select one or more search queries that correspond to the given keyword by filtering out search queries that do not meet the match type requirements of the given keyword.

In some implementations, the data processing system can provide the identified subset of search queries that can be targeted by the given keyword for display. The data processing system can provide the identified subset of search queries responsive to determining the search queries that correspond to the given keyword. In some implementations, the data processing system can display the search queries on a user interface to a third-party content provider. In some implementations, the third-party content provider can then, via the user interface, modify the given keyword to target a different set of search queries.

FIG. 1 is a block diagram depicting one implementation of an environment for providing a third-party content provider a plurality of potential search queries that may be targeted by a given keyword. In particular, FIG. 1 illustrates a system 100 for providing, for display, potential search queries that may be targeted by a given keyword. The system 100 can utilize historical advertising auction data to identify potential search queries that are likely to be targeted by a given keyword. The system can, in particular, identify previously submitted search queries that are likely to be targeted by the advertiser based on a particular keyword. Based on the identified search queries, an advertiser can adjust the keyword accordingly to more closely target a desired set of search queries. For example, the system may identify a plurality of search queries that correspond to the keyword "pool." The advertiser may determine that some of the identified search queries relate to swimming pools, while other search queries relate to billiards, while some other search queries relate to car pools. The advertiser, upon determining that the keyword pool targets three different types of pools, can adjust the keyword on which to place bids to "swimming pool" such that the search queries the advertiser targets are likely related to swimming pools but not pool billiard or car pools.

The system 100 includes at least one data processing system 110. The data processing system 110 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The data processing system 110 can include one or more processors or other logic devices such as a computing device having a processor to communicate via a network 105 with at least one user computing device 115. In some implementations, the user computing device 115 and the data processing system 110 can communicate with one another via the network 105.

The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The user computing device 115 may be any number of different user electronic devices, for example, a laptop computer, a desktop computer, a tablet computer, a smartphone, a digital video recorder, a set-top box for a television, a video game console, or any other computing device configured to communicate via the network 105. The user computing device can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The user computing device 115 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the user computing device 115 (e.g., a built-in display, microphone, etc.) or external to the housing of the user computing device 115 (e.g., a monitor connected to the user computing device 115, a speaker connected to the user computing device 115, etc.), according to various implementations. For example, the user computing device 115 may include an electronic display, which visually displays web pages using webpage data received from one or more content sources and/or from the data processing system 110 via the network 105.

The data processing system 110 can include one or more computing devices or servers that can perform various functions. In some implementations, the data processing system 110 can include an advertising auction system configured to conduct advertising auctions. In some implementations, the data processing system 110 does not include the advertising auction system but is configured to communicate with the advertising auction system via the network 105. In some implementations, the advertising auction system is a part of the data processing system 110. In some implementations, the data processing system 110 includes at least one server of a pay per click (PPC) program, an advertisement auction program, or any other program that conducts advertising auctions.

The data processing system 110 can include at least one server. The data processing system 110 can include one or more modules, including an advertising auction data management module 125 and a search query identification module 130. The advertising auction data management module 125 is designed, configured or constructed to match keywords with search queries that an advertiser is likely to target when placing bids on the keywords. The search query identification module 130 is designed, configured or constructed to identify previously submitted search queries that may be targeted by an advertiser's keyword and provide the same for display. The data processing system 110 can also include one or more data stores, including database 140.

In particular, the advertising auction data management module 125 can be designed, constructed or configured to retrieve advertising auction data from an advertising auction log. In some implementations, the advertising auction log can be maintained by the advertising auction data management module 125. In some implementations, the advertising auction log can be maintained by another module of the data processing system 110, or by a module of an advertising auction program. The advertising auction log is configured to include all auction related data for each auction that takes place. The advertising auction log can be stored in the database 140 or a separate database, such as an auction data database 150 accessible by the advertising auction data management module 125. In some implementations, the advertising auction log can be updated in real time. In some implementations, the advertising auction log can be updated periodically, for example, every minute, hour, day, or week.

Referring briefly to FIG. 2A, an example implementation of an advertising auction log is shown. The advertising auction log 200 includes one or more entries. Each entry can include data, for example, an auction identifier 202, a search query 204, a spell-corrected search query 206, one or more winning advertisements 208a-n, one or more keywords 210a-n, country 212 and language 214. Winning ads 208 include ads that were selected for display with search results corresponding to a particular search query. In some implementations, there is more than one winning ad 208 for each search query 204. Each winning ad 208 corresponds to a bid placed on a particular keyword 210. As such, for each search query 204 submitted by a user for which winning ads 208 are selected for display, there are one or more keywords 210 that correspond to the search query 204.

In some implementations, one or more entries in the advertising auction log 200 can be generated responsive to receiving a search query 204. The search query 204 can be a string of text or data that a user provides to a search engine to receive search results. This search query 204 can be referred to herein as an originally submitted search query. The search query 204 can include one or more tokens. In some implementations, the search query can include misspelt tokens, punctuation marks, uppercase and lowercase letters, acronyms, amongst others. An example of a search query can be "flowerz sf."

The spell-corrected search query 206 can include a string of text or data that corresponds to the search query 204. In particular, the spell-corrected search query 206 can be a spell-corrected version of the originally submitted search query 204. For example, the spell corrected search query 206 of the search query "flowerz sf" can be "flowers sf." In some implementations, a spell-correction module or routine can rewrite an originally submitted search query to correct for typographical errors or acronyms. In some implementations, the spell correction module can identify individual tokens of the search query and determine if any of the identified tokens is misspelt. In some implementations, the spell correction module can replace acronyms with a long form. For example, in some implementations, the spell corrected search query 206 of the actual search query "flowerz sf" can be "flowers san francisco." The spell-correction module can be a part of the module responsible for maintaining the advertising auction log.

The country data 212 corresponds to the country from where the search query 204 was received. In some implementations, the country information associated with the search query can be determined from an identifier associated with a user computing device through which the search query was submitted. In some implementations, the country data 212 can correspond to any geographic region, not limited to a particular country. The language data 214 corresponds to the language in which the search query was received. Both the country data 212 and the language data 214 together can be referred to as targeting criteria. Advertisers may target ad placement by bidding on keywords associated with particular country data 212 and language data 214.

For situations in which the systems discussed herein collect personal information about a user, or may make use of personal information, the user may be provided with an opportunity to control which programs or features collect such information, the types of information that may be collected (e.g., a user's preferences, a user's current location, a user's language, a user's type of device, etc.), and/or how third-party content may be selected by the data processing system and presented to the user. Certain data, such as a device identifier, may be anonymized in one or more ways before it is stored or used, so that personally identifiable information is removed when generating parameters (e.g., demographic parameters) used by the data processing system to select third-party content. For example, a device identifier may be anonymized so that no personally identifiable information about its corresponding user can be determined from it. In another example, a user's geographic location may be generalized where location information is obtained (such as to a city, ZIP code, state or country level), so that a precise location of the user cannot be determined. Thus, the user may have control over how information is collected about him or her and used by the data processing system 110. In some implementations, the user can be a user providing a search query or an advertiser providing one or more ads for display. Moreover, certain data can be used by the data processing system as aggregate data. Any personally identifiable information is removed when using such aggregate data. In some implementations, users may be provided with an opportunity to control whether such data can be used by the data processing system. Specifically, the data processing system described herein may be designed in such a way that no personal information of a user, like queries containing personal information, is ever shown to third parties. In some implementations, the system ensures that a certain number of different users have issued the same query for at least a certain number of times and only shows queries complying with this criterion to third parties such that no queries containing personal information are ever shown to third parties.

The advertising auction log 200 can also store auction related data of advertising auctions for selecting ads for display along with primary content. In some implementations, the primary content can be search results that are responsive to the search queries submitted by users. In some other implementations, the primary content can be web content of a webpage. In some such implementations, the advertisers bid on keywords that correspond to the webpage or the primary content associated with the webpage. For example, if a user requests to visit a webpage, such as, for example, www.luxurycars.com, the keywords on which advertisers can bid may include "cars," "luxury cars," "expensive cars," amongst others, as the primary content likely relates to luxury cars. In some implementations, the log can include one or more additional fields that contain webpage addresses and terms that relate to the primary content of such webpages.

In some implementations, the advertising auction data management module 125 can be configured to retrieve auction related data from the advertising auction log 200 in real-time. In some implementations, the advertising auction data management module 125 can be configured to retrieve auction related data from the advertising auction log 200 periodically, for example, hourly, daily or weekly. The advertising auction data management module 125 can be configured to retrieve auction related data by making a call to the advertising auction log 200.

Referring now again to FIG. 1, the advertising auction data management module 125 can be designed, constructed or configured to construct an index that maps advertiser keywords to sets of query strings that match the advertiser keywords. The advertising auction data management module 125 can use the index to efficiently identify search queries that may be targeted by a given advertiser keyword. In some implementations, the advertising auction data management module 125 can construct the index by generating one or more tables. In some implementations, the tables can be string to string value tables.

In some implementations, the advertising auction data management module 125 can be configured to generate at least one table for each of the keywords 210*a-n*. The keywords correspond to advertisements that were selected for display along with primary content, which can relate to search results for a particular search query. As such, the advertising data management module 125 can be configured to generate a table that includes a list of search queries that correspond to a particular keyword. The list of search queries includes search queries previously submitted by users for which ads were selected for display based on bids submitted by advertisers on the particular keyword.

In some implementations, the advertising auction data management module 125 can be configured to identify new entries in the advertising auction log. Responsive to identifying the new entries added to the advertising auction log, the advertising auction data management module 125 can identify, for each new entry, a keyword for which a winning ad was selected for display.

In response to identifying the keyword, the advertising auction data management module 125 determines if the advertising auction data management module 125 has previously created a table for the particular identified keyword. If the advertising auction data management module 125 determines that a table has not been created for the identified keyword, the advertising auction data management module 125 creates a table for the identified keyword and includes an entry that includes the search query associated with the identified keyword. Conversely, if the advertising auction data management module 125 determines that the advertising auction data management module 125 has previously created a table for the identified keyword, the advertising auction data management module 125 updates the table to include an entry that includes the search query associated with the identified keyword. In some implementations, the keyword-specific table can be configured to include auction related data corresponding to auctions that occurred within a particular time frame, for example, auctions that have taken place within the past year, month, week, amongst others.

Referring now briefly to FIG. 2B, an example implementation of a keyword table is shown. The keyword table 250 is a keyword-specific table corresponding to a particular keyword through which one or more ads were selected for display. The keyword table 250 includes the actual keyword 252 on which an advertiser placed a bid, a search query 254 corresponding to the keyword 252 and a spell corrected search query 256. The search query 254 is the search query submitted by a user that resulted in an ad being selected for display by placing a winning bid on the keyword 252. The table can include one or more additional fields, such as the country data 258 and language data 260 associated with the search query and a query frequency 262 indicating a number of times a particular search query has been searched.

In some implementations, instead of generating at least one table for each winning keyword, the advertising auction data management module 125 can be configured to generate distinct tables for a raw form of one or more winning keywords. For example, the advertising auction log can include entries in which the winning bids were placed on the keywords "luxury cars," "luxurious cars," "luxury automobiles" and "luxury car." Instead of the advertising auction data management module 125 generating separate tables for each of these keywords, the advertising auction data management module 125 can identify the raw form of the keywords "luxury cars," "luxurious cars," "luxury automobiles" and "luxury car," and generate a table that corresponds to the raw form of the keywords. One example of the raw form of the keywords can be "car luxury." To generate a raw form of one or more winning keywords, the advertising auction data management module 125 can perform keyword normalization, which can include lowercasing, stripping punctuation and stemmings, amongst others. The advertising auction data management module 125 can further be configured to merge all permutations of the keyword tokens into one order-independent entry. This order-independent entry can be a raw form of one or more keywords. The rationale behind using order-independent entries is that broad match is order-insensitive on the part of the keyword, and merging keywords having similar but differently ordered tokens can help alleviate data sparseness.

In some implementations, the advertising auction data management module 125 can include a keyword rewriting service that can rewrite keywords to a raw form. The keyword rewriting service can be configured to replace plural terms with singular terms, rewrite words to a basic form, such as rewriting luxurious as luxury, and rewrite synonyms to a common term, such as rewriting automobile as car. In addition, the keyword rewriting service can be configured to correct misspelt words and replace acronyms with their long form. In some implementations, the tokens of the keyword may also be rearranged in alphabetical order. In some implementations, the keyword rewriting service can utilize one or more policies and rules for identifying tokens of a keyword that can be rewritten and rewriting such tokens according to one or more policies. In some implementations, the keyword rewriting service can utilize one or more resources for identifying the tokens and rewriting such tokens. Examples of resources can include dictionaries, previously submitted search queries, spell correction tools, amongst others.

The advertising auction data management module 125, upon determining a raw form of the keywords through which ads are selected for display, can be configured to generate distinct tables for each of the raw forms. In this way, fewer number of tables are formed, while each table can include a greater number of search queries. This can resolve any data sparseness issues that may arise for lower performing keywords. The performance of a particular keyword relates directly to the number of ads that are selected for display through bid placement on the particular keyword. A higher performing keyword results in a greater number of ads being selected for display in comparison to a lower performing keyword.

In some implementations, the advertising auction data management module 125 can be configured to generate keyword-specific tables for keywords through which a predetermined number of ads were selected for display. For example, the advertising auction data management module 125 can be configured to generate keyword-specific tables for only those keywords that received a predetermined number of winning bids. In some implementations, the predetermined number can be 1, 5, 10, 20, 50 or even greater than 50.

Referring now to FIG. 2B, an example implementation of a table including entries for a raw form is shown. Each entry can include a key and a value. The key can be a winning keyword 252, and the value can include one or more of a search query 254, a spell corrected search query 256, country data 258, language data 260, a permutation code 262*a-n* and a broad match modifier code 264*a-n*. In some implementations, each key can have a value that corresponds to multiple search queries. In some implementations, the advertising auction data management module 125 can be configured to populate the table 250 by retrieving data from the advertising auction log 200.

Referring back to FIG. 1, the advertising auction data management module 125 can be configured to store the generated tables in the database 140. In some implementations, the advertising auction data management module 125 can also store the index that maps a keyword with one or more search queries in the database 140. The database 140 can be accessed by both the advertising auction data management module 125 and the search query identification module 130.

The search query identification module 130 can be designed, constructed or configured to receive a request to identify one or more search queries that can be targeted by a particular keyword. The request can be received from an advertiser. In some implementations, the advertiser can submit the request via an advertising account that includes one or more keywords and one or more corresponding advertisements.

The search query identification module 130 can be configured to identify auction events associated with the particular keyword associated with the request. In some implementations, the search query identification module 130 can identify auction events associated with previously held auctions. The search query identification module 130 can identify auction events by identifying a table corresponding to the identified keyword. In some implementations, the search query identification module 130 can first determine if the identified keyword matches a keyword through which ads have previously been selected for display. In some implementations, the search query identification module 130 can determine if a keyword-specific table corresponding to the identified keyword exists.

In some implementations in which the keyword-specific tables are generated corresponding to a raw form of keywords, the search query identification module 130 can be configured to determine a raw form of the particular keyword associated with the request. Upon determining a raw form of the particular keyword, the search query identification module 130 can be configured to determine if a keyword-specific table corresponding to the raw form of the particular keyword exists.

In some implementations, the keywords that advertisers bid on may be of a specific match type. Match types help control which search queries can trigger an advertiser's ads. The broader the match type, the more search queries can trigger an advertiser's ads. The match types can range from broad to narrow and include a broad match, a broad match modifier, a phrase match, an exact match and a negative match, amongst others. Each of the match types can be specified by a special symbol. If a keyword has a broad match type, for example, "women's hats," ads may show on searches that include misspellings, synonyms, related searches and other relevant variations. An example search that may trigger an ad can include "buy ladies hats." If the keyword has a broad match modifier type, for example, +women's +hats, ads may show on searches that include the modified term or close variations, but not synonyms, in any order. An example search that may trigger an ad can include "woman's hats." If a keyword has a phrase match type, for example, "'women's hats',' ads may show on searches that include the phrase or close variations of that phrase. An example search that may trigger an ad can include "buy women's hats." If a keyword has an exact match type, for example, "[women's hats]," ads may show on searches that include the exact term and close variations of the exact term. In this example, the term is women's hats. An example search that may trigger an ad can include "women's hats." Other types of match types include near-phrase and near-exact match types. In these match types, close variations, such as plurals, misspellings and stemmings may trigger an ad being shown, while synonyms do not trigger an ad being shown. If the keyword has a negative match type, for example, "–baseball," ads may show on searches that do not include the term baseball. As such, ads will not show for searches that include the term "baseball." Negative keywords are a useful way to filter out irrelevant traffic and thus prevent unwanted clicks by preventing ads from being selected for display in response to receiving a search query including a particular term.

The search query identification module 130 can be configured to identify search queries that match a particular keyword having a specific match type by utilizing the keyword-specific tables generated by the advertising auction data management module 125. In some implementations, the search query identification module 130 can first identify a set of queries that match the most permissive match type of the particular keyword associated with the request received by the search query identification module 130. The search query identification module 130 can perform a lookup in one or more keyword-specific tables for search queries corresponding to a broad match type of the particular keyword. As described above, the keyword-specific tables generated by the advertising auction data management module 125 can be based on a raw form of one or more keywords or may be specific to each keyword included in the advertising auction log. In some implementations, the raw form may be as broad as or even broader than a broad-match type of the actual keyword. As a result, when the search query identification module 130 performs a lookup in a table corresponding to the raw-form of the particular keyword, the search query identification module 130 can identify search queries that match a broad match type of the particular keyword.

Upon identifying a set of search queries that match the most permissive match type of the particular keyword, the search query identification module 130 can identify a subset of the search queries that are compatible with the specified match type of the particular keyword received in the request. In some implementations, the search query identification module 130 can identify a list of keywords that are compatible with the match type of the particular keyword. Upon identifying the list of compatible keywords, the search query identification module 130 can identify the search queries that correspond to the list of compatible keywords based on the ads that were selected for display by placing winning bids on the compatible keywords. Upon identifying the search queries, the search query identification module 130 can identify additional data related to the search queries, including one or more spell corrected versions of the search queries, a number of the times the search queries were submitted, the targeting criteria associated with the search queries, amongst others. The search query identification module 130 can then provide the search queries and the additional data for display to the advertiser associated with the request.

Figure 2C:
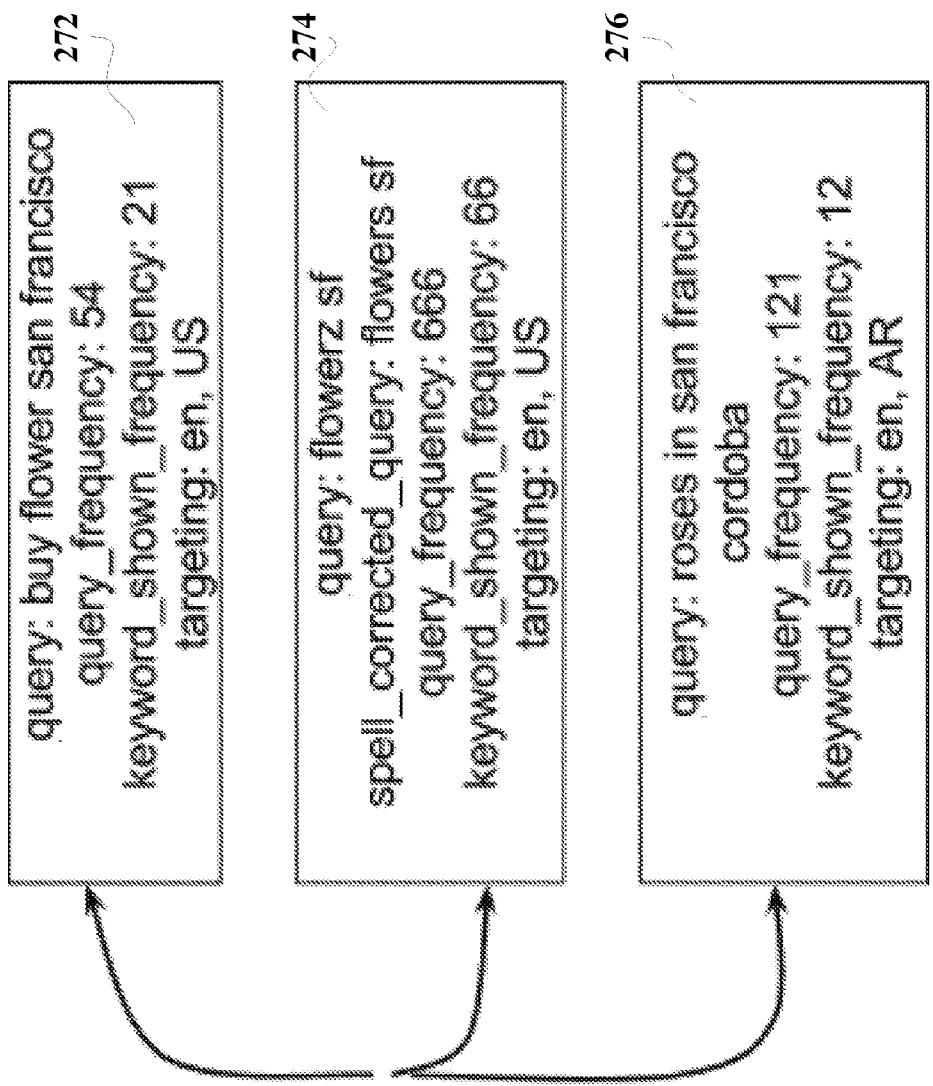
FIG. 2C is a diagram depicting one implementation of search queries and associated information that correspond to a string of alphabetically sorted keyword tokens corresponding to the raw form of the keyword of the table shown in FIG. 2B.

Referring now to FIG. 2C, an example index entry for the raw form of one or more keywords is shown. In particular, the raw form is "flowers francisco san." The raw form is an alphabetically sorted set of tokens that encompasses one or more keywords. Examples of keywords that are encompassed by the raw form include "flowers sf," "sf flowers," "san francisco flowers," "sf flower," amongst others. As shown in FIG. 2C, the raw form can target a plurality of search queries, including the search queries "buy flower san francisco," "flowerz sf" and "roses in san francisco cordoba" that are included in the respective values 272, 274 and 276. These search queries and related data shown in FIG. 2C may be extracted from the advertising auction log. In some implementations, the spell-corrected search query may be generated by the advertising auction data management module 125 when generating the tables. The query frequency and the keyword frequency as well as the targeting criteria may be determined from the advertising auction log. In addition to the search queries, each of the values 272, 274 and 276 can also include a spell-corrected search query and a query frequency indicating a number of the times the search query was submitted. The values can also include a keyword shown frequency indicating the number of times a winning ad corresponding to the keyword was selected for display as well as targeting criteria indicating the language and location associated with the search query.

As described above, the search query identification module 130 can identify search queries from a table to which a particular keyword corresponds, a match type of the keyword, and targeting criteria, such as country and language data, and narrows down the set of search queries retrieved from the table to search queries that satisfy the match type and targeting criteria associated with the keyword. In the example shown in FIG. 2C, if the specific keyword is "flowers san francisco" having a near-phrase match type, the search query identification module 130 would only keep the search query string buy flower san francisco, assuming that rewriting the token 'flower' as 'flowers' qualifies as a near-variant rewrite.

In some implementations, the advertising auction data management module 125 may be configured to generate a permutation code for each of the keywords subsumed by the raw form of the keyword. Assuming a normalized keyword is represented as flowers, Francisco, san, in which the tokens are sorted alphabetically, there are six possible permutations that can be generated based on the three tokens, as shown in the table below.

| Raw form of the keyword (alphabetically sorted keyword tokens) | (flowers, francisco, san) |
| --- | --- |
| Permutation 1 | flowers francisco san |
| Permutation 2 | flowers san francisco |
| Permutation 3 | san flowers francisco |
| Permutation 4 | san francisco flowers |
| Permutation 5 | francisco flowers san |
| Permutation 6 | francisco san flowers |

In some order-insensitive match types, such as broad match type and broad match modifier, the only relevant distinction between the tokens is whether any of tokens are limited by a particular modifier, such as the + sign preceding some of the tokens of a keyword indicating a broad match modifier. The + sign preceding a token of a broad match modifier keyword means that the token has to be matched against a query word using only a restricted set of "trusted" rewrites. Thus, individual keywords that include one or more broad match modifiers preceding one or more tokens can be distinguished using a bitmask in which a 1 bit stands for a token preceded by a '+.' Conversely, a bitmask equal to zero indicates a regular broad keyword.

The table below shows a sample of keywords subsumed by different values of the bitmask for the unordered normalized keyword {flowers, francisco, san}.

The bitmask and the permutation code of a particular keyword are stored in the table as part of the value of the table in order to refer to individual keywords subsumed by the key. Each of the search queries included in the value of the table are annotated by the bitmask and a permutation code. The search query identification module can be configured to determine if a search query includes a token that matches a corresponding token of the keyword. If the keyword token includes a broad match modifier, the search query has to contain the broad match modifier eligible rewrite of the keyword token.

For example, the table corresponding to the alphabetically sorted keyword {flowers, francisco, san} can include the following queries, "flowerz sf" "sf flowers," "sf," and "buy flowers." Each of the queries can be accompanied by a corresponding bitmask suggesting that the search query corresponds to the tokens of the alphabetically-sorted keyword according to the corresponding bitmask. In this particular example, the bitmask corresponding to "flowerz sf" is [1, 1, 1]. The bitmask corresponding to "sf flowers" is [1, 1, 1]. The bitmask corresponding to the search query "sf" is [0, 1, 1] and the bitmask corresponding to the search query "buy flowers" is [1, 0, 0].

Although the implementation examples provided herein use the term "selected for display" when a certain third-party item is retrieved, this does not necessarily mean that the third-party item is actually displayed to a user. Alternative implementations can use a list of candidate third-party items that may be displayed to the user under certain circumstances, for example under the condition that the bid is high enough and the country targeting matches. These candidate third-party items may then be used to identify search queries that match a given keyword. Alternative implementations may not use the list of candidate third-party items that are retrieved by the auction management module that is responsible for serving user's requests, but may call an alternative auction management module that is configured to retrieve all third-party items that match a user's query irrespective of country targeting or other restrictions that may apply in actual serving. These third-party items may then be used to identify search queries that match a given keyword. Alternative implementations may also select queries from logs and call the auction management module as described above or use the code or library therein that is responsible for query to keyword matching in a batch process to determine the keywords that may match user queries.

Figure 3:
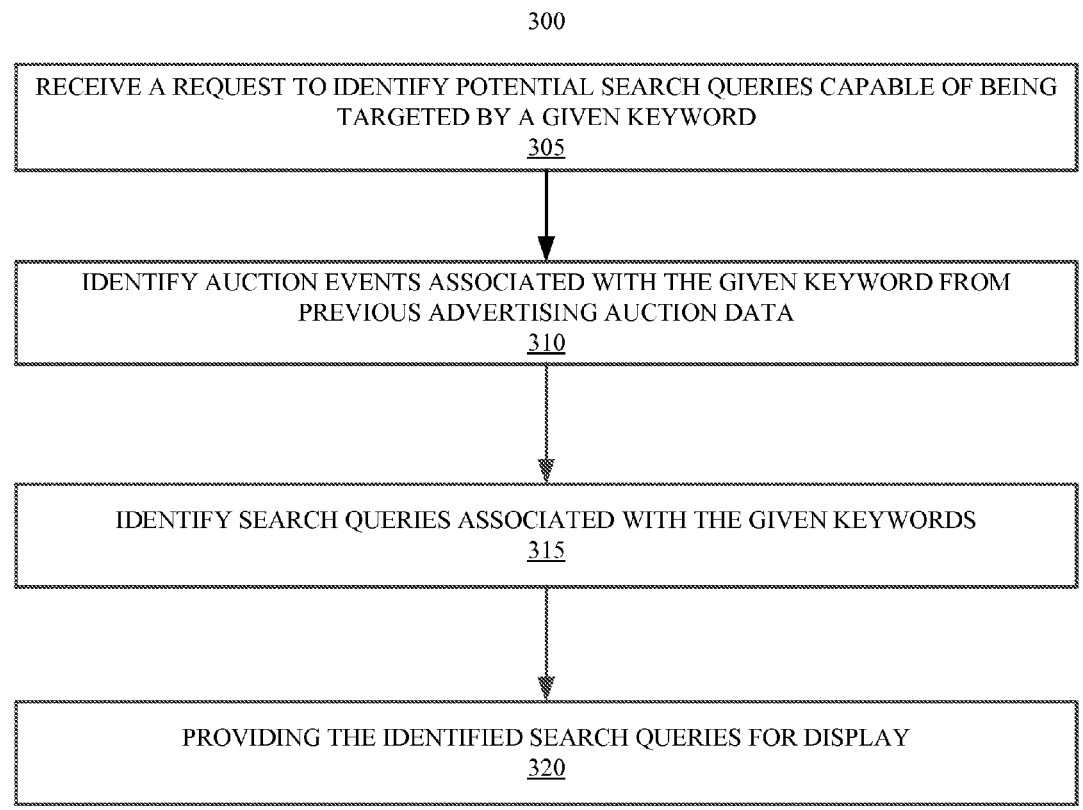
FIG. 3 is a flow diagram depicting one implementation of the steps taken to provide a third-party content provider a plurality of potential search queries that may be targeted by a given keyword.

FIG. 3 is a flow diagram depicting one implementation of the steps taken to provide a third-party content provider a plurality of potential search queries that may be targeted by a given keyword. In particular, FIG. 3 illustrates a flow diagram depicting a method 300 for providing an advertiser a plurality of potential search queries a third-party content provider a plurality of potential search queries that may be targeted by a given keyword. In brief overview, a search query identification module receives a request to identify potential search queries capable of being targeted by a given keyword (BLOCK 305). The search query identification module then identifies auction events associated with the given keyword from previous advertising auction data (BLOCK 310). The search query identification module identifies search queries associated with the given keywords (BLOCK 315). The search query identification module then provides the identified search queries for display (BLOCK 320).

In further detail, the search query identification module receives a request to identify potential search queries capable of being targeted by a given keyword (BLOCK 305). The request can be received from a user computing device associated with an advertiser having an advertising account. In some implementations, the request is triggered responsive to an advertiser requesting potential search queries that are capable of being targeted by a keyword selected by the advertiser. In some implementations, the request identifies a given keyword as well as a match type associated with the keyword. Examples of match types include broad, broad match modifier, near phrase, exact phrase, exact, amongst others.

The search query identification module then identifies auction events associated with the given keyword from previous advertising auction data (BLOCK 310). The search query identification module can be configured to identify auction related events stored in a table corresponding to the given keyword associated with the request. The table can be generated by the advertising auction data management module, which can retrieve auction related data from an advertising auction log. The table can include an index through which keyword-query pairs are formed. The keyword-query pairs include queries for which ads were selected for display, the ads being selected to be displayed along with search results corresponding to the search queries, and the ads being selected based on bids placed on the keyword associated with the keyword-query pairs.

The search query identification module identifies search queries associated with the given keywords (BLOCK 315). The search query identification module can be configured to first identify a raw form of the given keyword. The raw form of the given keyword is configured to subsume multiple keywords that are generally related to one another. Upon identifying the raw form of the given keyword, the search query identification module can identify a table corresponding to the raw form of the given keyword. The search query identification module can further identify search queries corresponding to the raw form of the given keyword. The search query identification module can then identify from the identified search queries, a subset of search queries that correspond to the match type and targeting criteria of the given keyword.

The search query identification module then provides the identified search queries for display (BLOCK 320). The search query identification module can be configured to provide the identified subset of search queries that correspond to the match type and targeting criteria of the given keyword for display to the advertiser. In some implementations, the identified subset of search queries is displayed responsive to receiving the request in BLOCK 305. The search query identification module can be further configured to provide additional information associated with the identified subset of search queries including a query frequency indicating a number of times the search query has previously been requested within a particular time period, a number of times a winning ad selected for display has been selected according to a bid placed on the given keyword, amongst other information.

Figure 4:
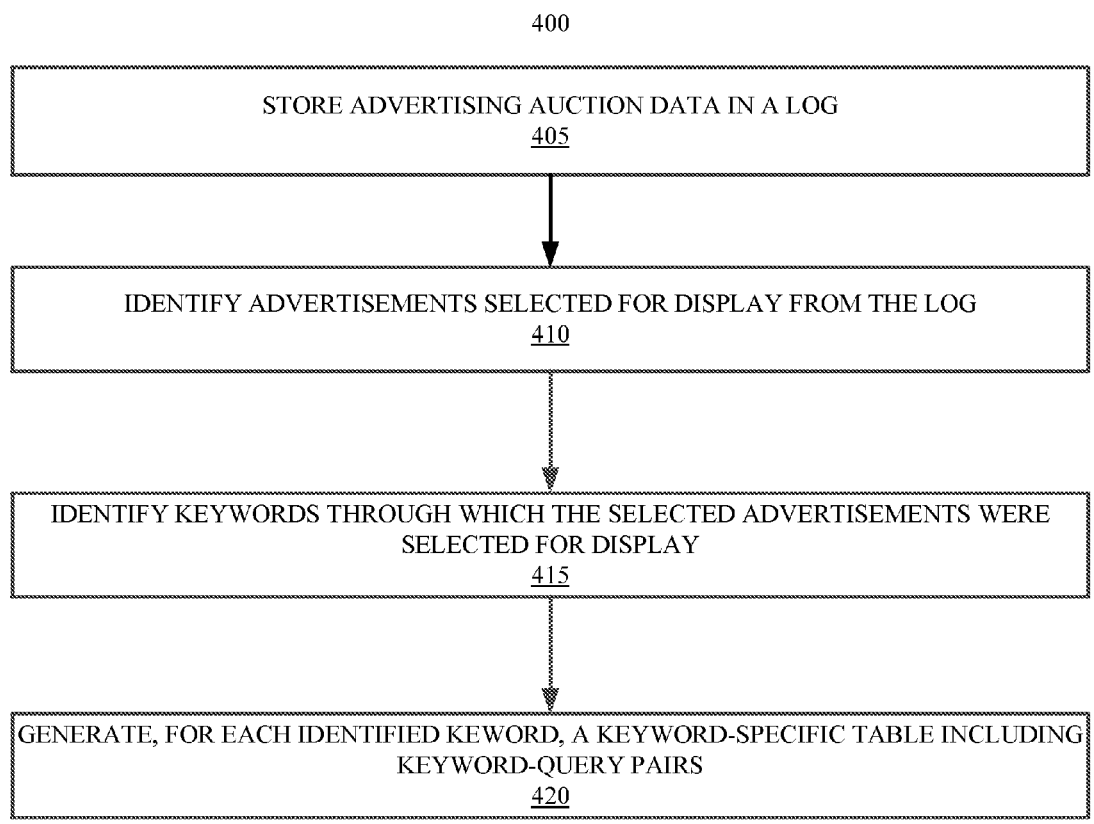
FIG. 4 is a flow diagram depicting one implementation of the steps taken to generate keyword-specific tables that includes keyword-query pairs.

FIG. 4 is a flow diagram depicting one implementation of the steps taken to generate keyword-specific tables that includes keyword-query pairs. In brief overview, an advertising auction data management module stores advertising auction data in a log (BLOCK 405). The advertising auction data management module identifies advertisements selected for display from the log (BLOCK 410). The advertising auction data management module identifies keywords through which the selected advertisements were selected for display (BLOCK 415). The advertising auction data management module then generates, for each identified keyword, a distinct keyword-specific table including one or more keyword-query pairs (BLOCK 420).

In further detail, an advertising auction data management module stores advertising auction data in a log (BLOCK 405). In some implementations, the advertising auction data management module can collect advertising auction data associated with one or more advertising auctions. In some implementations, the advertising auction data management module can be configured to identify a search query that is either submitted by a user or that is derived from webpage information including primary content of the webpage for which ads are being selected for display. The advertising auction data management module can store the advertising auction data in an advertising auction log. The log can include an advertising auction identifier, a search query, a spell corrected search query if a user submitted a misspelt search query, an identity of one or more winning ads, one or more keywords on which an advertiser of the winning ads placed a bid, targeting criteria associated with the auction including country and language data, amongst others.

The advertising auction data management module identifies advertisements selected for display from the log (BLOCK 410). From the advertising auction log, the advertising auction data management module identifies the winning ads stored in the advertising auction log. The advertising auction data management module then identifies keywords through which the selected advertisements were selected for display (BLOCK 415). In some implementations, the advertising auction data management module then identifies keywords through which the selected advertisements were selected for display from the advertising auction log. In some implementations, each search query can be associated with one or more keywords as multiple ads can be selected for display responsive to receiving a search result. In some implementations, the advertising auction data management module can be configured to determine one or more raw forms of the identified keywords through which the selected advertisements were selected for display. The advertising auction data management module can determine a raw form of a keyword by performing keyword normalization, which can include replacing plural terms with singular terms, removing stemmings, performing rewrites and reordering tokens of a keyword in alphabetical order.

The advertising auction data management module then generates, for each identified keyword, a distinct keyword-specific table including one or more keyword-query pairs (BLOCK 420). The keyword-query pairs correspond to a search query and a keyword through which a winning ad was selected for display along with primary content, such as search results, associated with the search query. In addition, one or more of the keyword-query pairs can include additional data, including but not limited to the targeting criteria associated with the search query, a match type of the keyword, amongst others.

Figure 5:
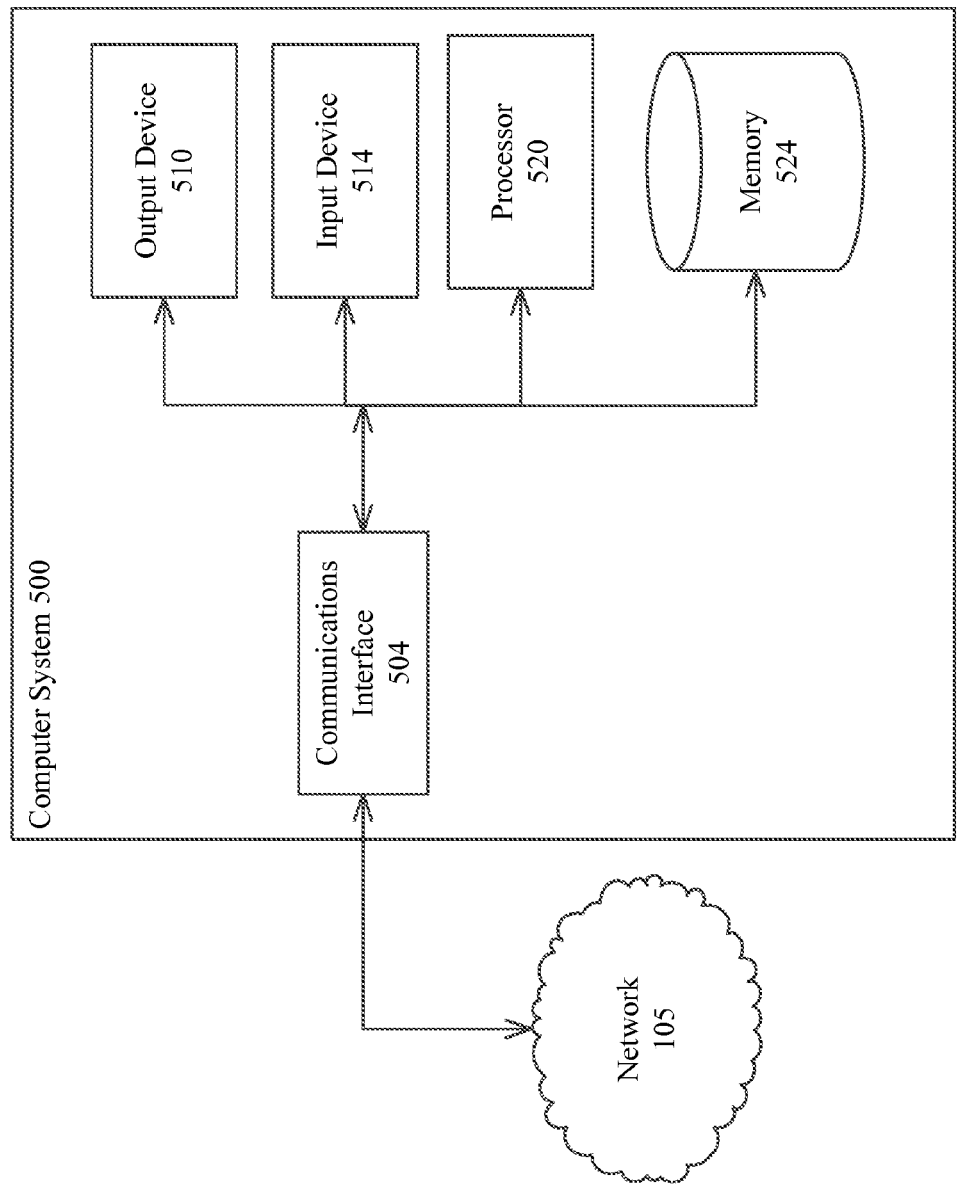
FIG. 5 is a block diagram illustrating a general architecture for a computer system that may be employed to implement various elements of the systems and methods described and illustrated herein, according to an illustrative implementation.

FIG. 5 shows the general architecture of an illustrative computer system 500 that may be employed to implement any of the computer systems discussed herein (including the system 100 and its components such as the advertising auction data management module 125 and the search query identification module 130) in accordance with some implementations. The computer system 500 can be used to provide information via the network 105 for display. The computer system 500 of FIG. 5 comprises one or more processors 520 communicatively coupled to memory 525, one or more communications interfaces 504, and one or more output devices 510 (e.g., one or more display units) and one or more input devices 515. The processors 520 can be included in the data processing system 110 or the other components of the system 100 such as the strategic competitor identification module 125 and competitor data presentation module 130.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the advertising auction data management module 125 and search query identification module 130 can include the memory 525 to store information related to one or more advertisers, one or more ad auctions, advertising performance metric data associated with ads of the advertisers, including but not limited to impression volume, click volume, click through rates, conversion volumes, cost per acquisition data, revenues per conversion data, amongst others. The memory 525 can include the database 140. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 504 to transmit or receive various information pursuant to execution of instructions. For example, the communications interface(s) 504 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 500. Examples of communications interfaces 504 include user interfaces (e.g., web pages), through which the user can communicate with the data processing system 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The advertising auction data management module 125, the search query identification module 130 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 500 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the advertising auction data management module 125 and the search query identification module 130 can be part of the data processing system 110, a single module, a logic device having one or more processing modules, one or more servers, or part of a search engine.

Having now described some illustrative implementations and applications, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same embodiment. Any implementation or embodiment may be combined with any other embodiment, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to an advertising program, the systems and methods described herein can be applied to any program in any vertical in which strategic competitors are to be identified or performance data of the identified strategic competitors is to be provided to a user. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for providing a third-party content provider with search queries that may be targeted by a given keyword, comprising:

receiving, at a processor of a data processing system from a content provider computing device, a request to identify a plurality of search queries that match a keyword;

determining, by the processor, a raw form of the keyword by arranging tokens corresponding to the keyword in alphabetical order and performing one or more of correcting misspelt words, replacing plural words with singular words, and replacing uppercase letters with lowercase letters;

retrieving, by the processor, from a table corresponding to the raw form of the keyword, a plurality of potential search queries with which a content item was selected for display responsive to a bid for a keyword that corresponds to the raw form of the keyword;

providing, by the processor to the content provider computing device, the plurality of potential search queries; and receiving, at the processor from the content provider computing device, a selection of a search query of the plurality of potential search queries and a bid associated with the search query.

2. The method of claim 1, wherein the table includes one or more of targeting information, a query frequency, a keyword frequency with which a particular keyword was used to select a third-party content item showed, and a spell-corrected query.

3. The method of claim 1, further comprising:

identifying, from a log of historical auction data, a plurality of keywords associated with third-party content items selected for display responsive to receiving a search query;

determining a raw form of each of the identified keywords; and generating a second table for each of the determined raw forms, the second table including one or more search queries, a frequency of the search queries, a permutation code indicating an order of tokens that comprise the raw forms and a broad match modifier indicating a match type for each of the tokens.

4. The method of claim 3, wherein determining if the number of search queries corresponding to the raw form of each of the identified keywords exceeds a predetermined threshold; and responsive to the determination, generating a third table for the identified keywords that correspond to a number of search queries that exceeds the predetermined threshold.

5. The method of claim 1, further comprising identifying, from a log of historical auction data, a plurality of keywords associated with third-party content items selected for display responsive to receiving a search query, wherein the plurality of keywords are identified from auctions that occurred within a predetermined time range.

6. The method of claim 1, wherein the determined search queries that correspond to the given keyword can be targeted by the given keyword based on a match type associated with the given keyword.

7. A system for providing a third-party content provider a plurality of potential search queries that may be targeted by a given keyword, the system comprising:

a memory storing processor-executable instructions; and a processor configured to:
- receive, from a content provider computing device, a request to identify a plurality of search queries that match a keyword;
- determine a raw form of the keyword by arranging tokens corresponding to the keyword in alphabetical order and performing one or more of correcting misspelt words, replacing plural words with singular words, and replacing uppercase letters with lowercase letters;
- retrieve from a table corresponding to the raw form of the keyword, a plurality of potential search queries with which a content item was selected for display responsive to a bid for a keyword that corresponds to the raw form of the keyword;
- provide, to the content provider computing device, the plurality of potential search queries; and
- receive, from the content provider computing device, a selection of a search query of the plurality of potential search queries and a bid associated with the search query.

8. The system of claim 7, wherein the table includes one or more of targeting information, a query frequency, a keyword frequency with which a particular keyword was used to select a third-party content item showed, and a spell-corrected query.

9. The system of claim 7, wherein the processor is further configured to:
- identify, from a log of historical auction data, a plurality of keywords associated with third-party content items selected for display responsive to receiving a search query;
- determine a raw form of each of the identified keywords; and
- generate a second table for each of the determined raw forms, the second table including one or more search queries, a frequency of the search queries, a permutation code indicating an order of tokens that comprise the raw forms and a broad match modifier indicating a match type for each of the tokens.

10. The system of claim 9, wherein determining if the number of search queries corresponding to the raw form of each of the identified keywords exceeds a predetermined threshold; and
- responsive to the determination, generating a third table for the identified keywords that correspond to a number of search queries that exceeds the predetermined threshold.

11. The system of claim 7, wherein the processor is further configured to identify, from a log of historical auction data, a plurality of keywords associated with third-party content items selected for display responsive to receiving a search query, wherein the plurality of keywords are identified from auctions that occurred within a predetermined time range.

12. A non-transitory computer-readable storage medium for providing a third-party content provider a plurality of potential search queries that may be targeted by a given keyword, the computer-readable storage medium having computer-executable instructions stored thereon, which when executed by a computer, cause the computer to:
- receive, from a content provider computing device, a request to identify a plurality of search queries that match a keyword;
- determine a raw form of the keyword by arranging tokens corresponding to the keyword in alphabetical order and performing one or more of correcting misspelt words, replacing plural words with singular words, and replacing uppercase letters with lowercase letters;
- retrieve from a table corresponding to the raw form of the keyword, a plurality of potential search queries with which a content item was selected for display responsive to a bid for a keyword that corresponds to the raw form of the keyword;
- provide, to the content provider computing device, the plurality of potential search queries; and
- receive, from the content provider computing device, a selection of a search query of the plurality of potential search queries and a bid associated with the search query.

13. The non-transitory computer-readable storage medium of claim 12, wherein the processor is further configured to:
- identify, from a log of historical auction data, a plurality of keywords associated with third-party content items selected for display responsive to receiving a search query;
- determine a raw form of each of the identified keywords; and
- generate a table for each of the determined raw forms, the table including one or more search queries, a frequency of the search queries, a permutation code indicating an order of tokens that comprise the raw forms and a broad match modifier indicating a match type for each of the tokens.

* * * * *